US010606126B2

(12) United States Patent
Kim et al.

(10) Patent No.: US 10,606,126 B2
(45) Date of Patent: Mar. 31, 2020

(54) LIQUID CRYSTAL DISPLAY DEVICE

(71) Applicant: LG DISPLAY CO., LTD., Seoul (KR)

(72) Inventors: HyunSeung Kim, Seoul (KR); YoonJung Eo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 99 days.

(21) Appl. No.: 15/797,998

(22) Filed: Oct. 30, 2017

(65) Prior Publication Data

US 2018/0120648 A1 May 3, 2018

(30) Foreign Application Priority Data

Oct. 31, 2016 (KR) .................. 10-2016-0143648

(51) Int. Cl.
*G02F 1/1335* (2006.01)

(52) U.S. Cl.
CPC .. *G02F 1/133621* (2013.01); *G02F 1/133509* (2013.01); *G02F 1/133514* (2013.01); *G02F 1/133528* (2013.01); *G02F 2001/133562* (2013.01); *G02F 2001/133614* (2013.01); *G02F 2201/08* (2013.01)

(58) Field of Classification Search
CPC ................................................ G02F 1/133509
See application file for complete search history.

(56) References Cited

U.S. PATENT DOCUMENTS

| 6,249,372 | B1* | 6/2001 | Kobayashi | H01L 27/322 |
| | | | | 250/486.1 |
| 2006/0076881 | A1* | 4/2006 | Kim | G02F 1/133617 |
| | | | | 313/496 |
| 2007/0254240 | A1* | 11/2007 | Sasaki | C09D 11/101 |
| | | | | 430/270.1 |
| 2012/0326180 | A1* | 12/2012 | Ohe | H01L 27/322 |
| | | | | 257/88 |
| 2014/0160408 | A1* | 6/2014 | Cho | G02F 1/133617 |
| | | | | 349/110 |
| 2014/0160409 | A1* | 6/2014 | Li | G02F 1/1339 |
| | | | | 349/110 |
| 2014/0160410 | A1* | 6/2014 | Yamamoto | B29D 11/00798 |
| | | | | 349/112 |
| 2015/0286095 | A1* | 10/2015 | Wang | G02B 6/0068 |
| | | | | 349/42 |
| 2016/0161657 | A1* | 6/2016 | Yamada | G02F 1/1336 |
| | | | | 349/62 |
| 2016/0313599 | A1* | 10/2016 | Kwon | G02F 1/133514 |
| 2018/0291265 | A1* | 10/2018 | Schwarz | C09K 11/06 |

FOREIGN PATENT DOCUMENTS

KR 10-2013-0066451 6/2013

* cited by examiner

*Primary Examiner* — Sang V Nguyen
(74) *Attorney, Agent, or Firm* — Seed Intellectual Property Law Group LLP

(57) ABSTRACT

The present disclosure provides a liquid crystal display device including a light source unit which supplies light to a liquid crystal panel, a lower polarizing plate disposed below the liquid crystal panel, an upper polarizing plate, a light absorption filter, and a fluorescent filter disposed above the liquid crystal panel. According to the present disclosure, when a laser pointer in a visible ray region illuminates after implementing a display image, light irradiated by the laser is absorbed by the fluorescent filter and the light absorption filter to convert the light into red, green, and blue light to be emitted, thereby improving visibility in accordance with illumination of a laser pointer.

20 Claims, 5 Drawing Sheets

LIQUID CRYSTAL DISPLAY DEVICE

CROSS-REFERENCE TO RELATED APPLICATIONS

This application claims the priority of Korean Patent Application No. 10-2016-0143648 filed on Oct. 31, 2016, in the Korean Intellectual Property Office, the disclosure of which is incorporated herein by reference.

BACKGROUND

Technical Field

The present disclosure relates to a display device, and more particularly, to a liquid crystal display device which may improve visibility in accordance with irradiation of a laser pointer in a visible ray region after implementing a display image.

Description of the Related Art

In a recent information society, importance of a display device as a visual information delivery medium is further emphasized. Therefore, in order to occupy a major position in the future, the display device needs to satisfy requirements such as low power consumption, small thickness, light weight, and high image quality.

The display device may be divided into a light emission type which emits light by itself, such as a cathode ray tube (CRT), an electro luminescence element (EL), a light emitting diode (LED), a vacuum fluorescent display device (VFD), a field mission display device (FED), and a plasma display panel (PDP) and a non-emission type which cannot emit light by itself, such as a liquid crystal display device (LCD).

Among the above-mentioned display devices, the liquid crystal display device is a device which displays images using optical anisotropy of liquid crystal. The liquid crystal display device has excellent visibility as compared with a CRT of the related art, has an average power consumption lower than that of a CRT with the same screen size, and has a lower heat dissipation amount so that it is getting the spotlight as a next-generation display.

A liquid crystal display device of the related art will be described below with reference to FIG. 1.

FIG. 1 is a view schematically illustrating a liquid crystal display device of the related art.

As illustrated in FIG. 1, the liquid crystal display device of the related art includes a liquid crystal panel 10, an upper polarizing plate 20 equipped above the liquid crystal panel 10, a lower polarizing plate 30 equipped below the liquid crystal panel 10, and a backlight unit (not illustrated) which provides light to the lower polarizing plate 30.

Here, the liquid crystal panel 10 is formed of a color filter substrate, a thin film transistor array substrate which is opposite to the color filter substrate, and a liquid crystal layer formed between two substrates.

In the liquid crystal display device, a gray scale to be displayed on the liquid crystal panel is determined by an electric field which is applied to the liquid crystal layer. Therefore, a black gray scale to a white gray scale may be represented according to a magnitude of an electric field which is applied to the liquid crystal layer. For example, when an applied electric field is high, a white gray scale is represented so that an entire screen of the liquid crystal display device is bright. In contrast, when the electric field applied to the liquid crystal layer is low, a black gray scale is displayed so that the screen of the liquid crystal panel is dark. By doing this, a gray scale from black to white may be represented.

The upper polarizing plate 20 and the lower polarizing plate 30 have individual polarizing axes and an upper polarizing axis of the upper polarizing plate 20 is perpendicular to a lower polarizing axis of the lower polarizing plate 30.

The upper and lower polarizing plates 20 and 30 polarize incident light to light having light components which are parallel to the respective polarizing plates.

In the liquid crystal display device of the related art, the lower polarizing plate polarizes light incident from the backlight unit (not illustrated) and the light polarized by the lower polarizing plate 30 is supplied to the liquid crystal panel 10.

A component of the polarized light is changed by a liquid crystal layer (not illustrated) after being supplied to the liquid crystal panel 10, to be supplied to the upper polarizing plate 20. The upper polarizing plate 20 polarizes the light incident from the liquid crystal panel 10 to emit the light.

In the liquid crystal display device of the related art with the above-described configuration, when a laser pointer illuminates a screen after driving the liquid crystal display device, most of light is transmitted or absorbed, which results in poor visibility. Specular reflection occurs in most of light which is partially reflected so that omni-directional visibility is deteriorated.

Further, a display visual (color) is distorted. Therefore, in order to ensure laser visibility, when a fluorescent film which is responsive to a visible ray is used, visibility of laser which illuminates from the outside may be improved. However, it causes stokes shift of an image from the liquid crystal display device to cause visual (color) distortion.

Specifically, when a near UV laser pointer 70 is applied, if eyes of a user are directly/indirectly exposed to UV light having a near wavelength of 405 nm which is a short wavelength visible light having a high energy, retina may be damaged.

BRIEF SUMMARY

An object to be achieved by the present disclosure is to provide a liquid crystal display device which improves visibility in accordance with irradiation of a laser pointer in a visible ray region after implementing a display image.

According to an aspect of the present disclosure, there is provided a liquid crystal display device. The liquid crystal display device includes a liquid crystal panel on which an image is displayed, a light source unit which supplies light to the liquid crystal panel, a lower polarizing plate disposed below the liquid crystal panel, and an upper polarizing plate, a light absorption filter, and a fluorescent filter disposed above the liquid crystal panel.

According to another aspect of the present disclosure, there is provided a liquid crystal display device. The liquid crystal display device includes a liquid crystal panel on which an image is displayed, a light source unit which supplies light to the liquid crystal panel, an upper polarizing plate disposed above the liquid crystal panel, a fluorescent filter disposed above the upper polarizing plate, and a lower polarizing plate and a light absorption filter disposed below the liquid crystal panel.

According to the present disclosure, in the liquid crystal display device, a fluorescent substance is formed on an external surface of the liquid crystal display device, so that visibility of a laser pointer may be improved. However, since a fluorescent substance which is responsive to a visible ray may sense light emitted from the display device to cause visual distortion, it is inevitable to apply a fluorescent substance which is sensitive to a region other than light emitted from the display, that is, UV.

For this reason, the present disclosure needs to use a laser in a specific wavelength range such as a UV band which is directly/indirectly harmful for eyes. Instead, a light absorption filter which absorbs light in the same range as a sensitive wavelength range is applied below the fluorescent substance to suppress distortion of light outgoing from the display device.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or yellow is converted into red) to improve visibility.

Therefore, according to the present disclosure, it is possible to improve visibility of an omni-directional laser pointer in a display driving screen.

Further, according to the present disclosure, the light absorption filter is disposed above the liquid crystal panel, so that reflectance is lowered and a contrast ratio is improved to improve visual sensitivity and implement high color reproduction.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
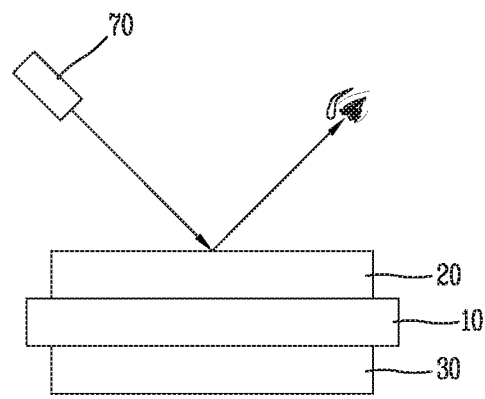
FIG. 1 is a view schematically illustrating a liquid crystal display device of the related art.

An exemplary embodiment of a liquid crystal display device according to the present disclosure will be described more fully hereinafter with reference to the accompanying drawings, so that those skilled in the art easily carry out the exemplary embodiment of the present disclosure.

Spatially relative terms, such as "below", "lower", "above", and "upper" are used herein only to describe relationships between one element or component and another element or components. These spatially relative terms should not be construed as limiting the embodiments provided herein to any particular orientation or direction. Rather, these spatially relative terms should be understood to include various directions or orientations of the elements, in addition to the directions illustrated in the drawing. For example, a device may be described as including a first element that is below a second element. However, when the device is turned over, the first element may then be disposed above the second element. Therefore, the example term "below" may encompass both an orientation of above and below, depending on an orientation of the device.

In the present disclosure, as an example, a liquid crystal display device will be described. However, the present disclosure is not limited thereto, but also applicable to an emission type display device such as an electro luminescence (EL) element, a light emitting diode (LED), a vacuum fluorescent display device (VFD), a field emission display (FED), and a plasma display panel (PDP) and a non-emission type display device.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed below and may be implemented in various forms and the scope of the present disclosure is not limited to the following embodiments. The exemplary embodiments may be provided to complete the disclosure and to fully disclose the scope of the present disclosure to those skilled in the art. The present disclosure is defined only by the scope of the claims. Like reference numerals indicate like elements throughout the specification.

Figure 2:
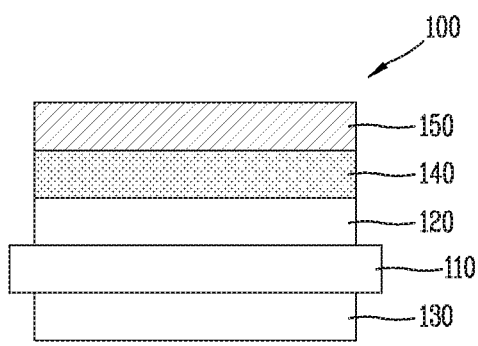
FIG. 2 is a cross-sectional view schematically illustrating a liquid crystal display device according to a first exemplary embodiment of the present disclosure.

FIG. 2 is a cross-sectional view schematically illustrating a liquid crystal display device according to a first exemplary embodiment of the present disclosure.

As illustrated in FIG. 2, a liquid crystal display device 100 according to a first exemplary embodiment of the present disclosure includes a liquid crystal panel 110 on which an image is displayed, an upper polarizing plate 120 disposed above the liquid crystal panel 110, a lower polarizing plate 130 disposed below the liquid crystal panel 110, a light absorption filter 140 disposed above the upper polarizing plate 120, and a fluorescent filter 150 which is disposed above the absorption filter 140.

Here, even though not illustrated in the drawing, the upper polarizing plate 120 and the lower polarizing plate 130 may include a polarizing layer (not illustrated) which polarizes incident light, first and second transparent supporter layers (not illustrated) disposed above and below the polarizing layer (not illustrated), and a pressure sensitive adhesive (hereinafter, abbreviated as "PSA") which is attached below the second transparent supporter layer (not illustrated).

The polarizing layer (not illustrated) is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The first and second transparent supporter layers (not illustrated) are films which support and protect the polarizing layer (not illustrated). Constituent materials of the first and second transparent supporter layers need to be optically transparent, do not cause double refraction, have heat resistance, and have a high mechanical strength to physically support and protect the polarizing layer (not illustrated).

Further, a surface thereof is vast and has a property which is capable of being bonded to a bonding agent or a pressure-sensitive adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornene resin.

In consideration of polarizing property and durability, desirably, a triacetyl cellulose (TAC) film in which a surface is saponified with alkali may be used.

The PSA (not illustrated) is applied to bond the polarizing plate having the above-described configuration to a liquid crystal cell. Therefore, an acrylic adhesive, a silicon adhesive, a polyester adhesive, a polyurethane adhesive, a polyether adhesive, or a rubber adhesive may be appropriately used to form the PSA. Specifically, in order to suppress peeling and exfoliation due to moisture absorption, lowering of chemical characteristics due to a difference in thermal expansion or curvature of a liquid crystal cell, and to form a high quality liquid crystal display device having excellent durability, it is desirable to use an adhesive having a low moisture absorption rate and excellent heat resistance.

Such an adhesive may be formed by forming a releasing cord by a releasing agent such as acrylic, silicon, acrylic silicon, polyester, heat-resistive rubber, long-chain acyl, fluorine, or molybdenum sulfide.

However, the upper polarizing plate 120 and the lower polarizing plate 130 are not limited to the above-described configuration, for example, a configuration which includes the polarizing layer, the first and second transparent supporter layers disposed above and below the polarizing layer, and the PSA disposed below the second transparent supporter layer. Therefore, the polarizing layer may be configured by a combination of various components. In the present disclosure, the above-described configuration has been described as one example.

In the meantime, the light absorption filter 140 is located below the fluorescent filter 150 and absorbs light in a predetermined wavelength range which is incident from a lower portion of the liquid crystal panel 110. In this case, Tetra-AzaPorphirin may be used as a material of the light absorption filter 140, but the material of the light absorption filter is not limited thereto.

Further, the light absorption filter 140 may absorb light in a predetermined wavelength range, for example, wavelength ranges of 380±50 nm (deep blue), 490±50 nm (cyan), 590±50 nm (yellow), 700±50 nm (deep red). In this case, the light absorption filter 140 is located below the fluorescent filter 150 to absorb light in the same wavelength range as a sensitive wavelength range of the fluorescent filter 150 to suppress distortion of light outgoing from the display.

However, as the light absorption wavelength (or the sensitive wavelength of the fluorescent filter), yellow or cyan is appropriate rather than red, green, and blue which may directly affect the image (display). The laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 150 is located at the outside of the upper polarizing plate 120 to absorb and excite light of a short wavelength having a high energy so that the light falls to a ground state to radiate long wavelength light.

Therefore, fluorescence is applied to a region of 400 nm or shorter having a high energy or a long wavelength region having a low energy among incident light which enters the upper polarizing plate 120 through the laser pointer (not illustrated) to change an optical spectrum of the incident light and control the color.

The fluorescent filter 150 absorbs light in a first wavelength range and emits the light in the first wavelength range to be light in a second wavelength range which is longer than the first wavelength range.

In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 150, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, or X-Rhodamine absorbs yellow light to emit red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

As described above, in order to solve a problem in that when the laser pointer illuminates a screen after driving the display, visibility is lowered at an angle other than a specific angle at which specular reflection occurs, the liquid crystal display device 100 according to the first exemplary embodiment of the present disclosure forms the fluorescent filter 150 on an external surface of the liquid crystal display device 100 to improve visibility of the laser pointer.

Further, the light absorption filter 140 which absorbs light in the same wavelength range as the sensitive wavelength range is further disposed below the fluorescent filter 150 to suppress distortion of light outgoing from the display.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or yellow is converted into red) to improve visibility.

Therefore, according to the present disclosure, the light absorption filter and the fluorescent filter are disposed above the upper polarizing plate, so that visibility of an omnidirectional laser pointer in a display driving screen may be improved.

Further, according to the present disclosure, the light absorption filter 140 is disposed above the liquid crystal panel 110, so that reflectance is lowered and a contrast ratio is improved to improve visual sensitivity and implement high color reproduction.

Figure 3:
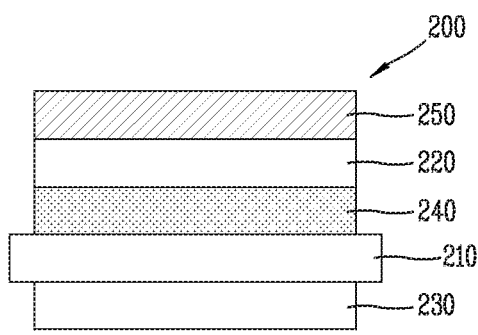
FIG. 3 is a cross-sectional view schematically illustrating a liquid crystal display device according to a second exemplary embodiment of the present disclosure.

FIG. 3 is a cross-sectional view schematically illustrating a liquid crystal display device according to a second exemplary embodiment of the present disclosure.

As illustrated in FIG. 3, a liquid crystal display device 200 according to a second exemplary embodiment of the present disclosure includes a liquid crystal panel 210 on which an image is displayed, a lower polarizing plate 230 disposed below the liquid crystal panel 210, a light absorption filter 240 disposed above the liquid crystal panel 210, an upper polarizing plate 220 disposed above the light absorption filter 240, and a fluorescent filter 250 which is disposed above the upper polarizing plate 220.

Here, even though not illustrated in the drawing, the upper polarizing plate 220 and the lower polarizing plate 230 may include a polarizing layer (not illustrated) which polarizes incident light, first and second transparent supporter layers (not illustrated) disposed above and below the polarizing layer (not illustrated), and a pressure sensitive adhesive (hereinafter, abbreviated as "PSA") which is attached below the second transparent supporter layer (not illustrated).

The polarizing layer (not illustrated) is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The first and second transparent supporter layers (not illustrated) are films which support and protect the polarizing layer (not illustrated). Therefore, constituent materials of the first and second transparent supporter layers need to be optically transparent, do not cause double refraction, have heat resistance, and have a high mechanical strength to physically support and protect the polarizing layer (not illustrated).

Further, a surface thereof is vast and has a property which is capable of being bonded to a bonding agent or a pressure-sensitive adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornene resin.

In consideration of polarizing property and durability, desirably, a triacetyl cellulose (TAC) film in which a surface is saponified with alkali may be used.

The PSA (not illustrated) is applied to bond the polarizing plate having the above-described configuration to a liquid crystal cell and may be formed appropriately using an adhesive such as an acrylic adhesive, a silicon adhesive, a polyester adhesive, a polyurethane adhesive, a polyether adhesive, or a rubber adhesive. Specifically, in order to suppress peeling and exfoliation due to moisture absorption, lowering of chemical characteristics due to a difference in thermal expansion or curvature of a liquid crystal cell and to form a high quality liquid crystal display device having excellent durability, it is desirable to use an adhesive having a low moisture absorption rate and excellent heat resistance.

Such an adhesive may be formed by forming a releasing cord by a releasing agent such as acrylic, silicon, acrylic silicon, polyester, heat-resistive rubber, long-chain acyl, fluorine, or molybdenum sulfide.

However, the upper polarizing plate 220 and the lower polarizing plate 230 are not limited to the above-described configuration, for example, a configuration which includes the polarizing layer, the first and second transparent supporter layers disposed above and below the polarizing layer, and the PSA disposed below the second transparent supporter layer. Therefore, the polarizing layer may be configured by a combination of various components. In the present disclosure, the above-described configuration has been described as one example.

In the meantime, the light absorption filter 240 is disposed between the liquid crystal panel 210 and the upper polarizing plate 220 and absorbs light in a predetermined wavelength entering from a light source unit which is equipped below the liquid crystal panel 210, that is, a backlight unit (not illustrated). In this case, Tetra-AzaPorphirin may be used as a light absorption material of the light absorption filter 240, but the material of the light absorption filter is not limited thereto.

Further, the light absorption filter 240 may absorb light in a predetermined wavelength range, for example, wavelength ranges of 380±50 nm (deep blue), 490±50 nm (cyan), 590±50 nm (yellow), 700±50 nm (deep red). In this case, the light absorption filter 240 is located below the upper polarizing plate 220 to absorb light in the same wavelength range as a sensitive wavelength range of the fluorescent filter 250 to suppress distortion of light outgoing from the display.

As the light absorption wavelength (or a sensitive wavelength of the fluorescent filter), yellow or cyan is appropriate rather than red, green, and blue which may directly affect the image (display). However, the laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 250 is located at the outside of the upper polarizing plate 220 to absorb and excite light of a short wavelength having a high energy so that the light falls to a ground state to radiate long wavelength light.

Therefore, fluorescence is applied to a region of 400 nm or shorter having a high energy or a long wavelength region having a low energy among incident light which enters the upper polarizing plate 220 through the laser pointer (not illustrated) to change an optical spectrum of the incident light and control the color.

The fluorescent filter 250 absorbs light in a first wavelength range and emits the light in the first wavelength range to be light in a second wavelength range which is longer than the first wavelength range. In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 250, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, or X-Rhodamine absorbs yellow light to be emitted to be red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

As described above, in order to solve a problem in that when the laser pointer illuminates a screen after driving the display, visibility is lowered at an angle other than a specific angle at which specular reflection occurs, the liquid crystal display device 200 according to the second exemplary embodiment of the present disclosure forms the fluorescent filter 250 at the outside of the liquid crystal display device 200, that is, on an external surface of the upper polarizing plate 220 to improve visibility of the laser pointer.

Further, the light absorption filter 240 which absorbs light in the same wavelength range as the sensitive wavelength range is further disposed below the upper polarizing plate 220 below the fluorescent filter 250 to suppress distortion of light outgoing from the display.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or Yellow is converted into red) to improve visibility.

Therefore, according to the present disclosure, the fluorescent filter 250 and the light absorption filter 240 are disposed above and below the upper polarizing plate 220, so that visibility of an omni-directional laser pointer in a display driving screen may be improved.

Further, according to the present disclosure, the light absorption filter 240 is disposed above the liquid crystal panel 210, so that reflectance is lowered and a contrast ratio is improved to improve visual sensitivity and implement high color reproduction.

Figure 4:
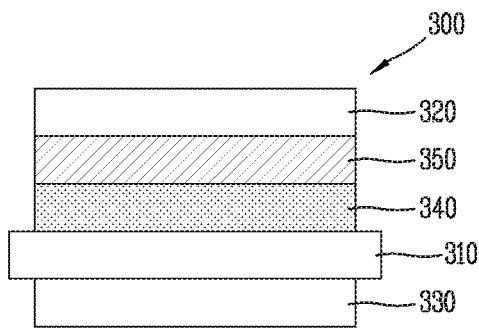
FIG. 4 is a cross-sectional view schematically illustrating a liquid crystal display device according to a third exemplary embodiment of the present disclosure.

FIG. 4 is a cross-sectional view schematically illustrating a liquid crystal display device according to a third exemplary embodiment of the present disclosure.

As illustrated in FIG. 4, a liquid crystal display device 300 according to a third exemplary embodiment of the present disclosure includes a liquid crystal panel 310 on which an image is displayed, a lower polarizing plate 330 disposed below the liquid crystal panel 310, a light absorption filter 340 and a fluorescent filter 350 disposed above the liquid crystal panel 310, and an upper polarizing plate 320 disposed above the fluorescent filter 350.

Here, even though not illustrated in the drawing, the upper polarizing plate 320 and the lower polarizing plate 330 may include a polarizing layer (not illustrated) which polarizes incident light, first and second transparent supporter layers (not illustrated) disposed above and below the polarizing layer (not illustrated), and a pressure sensitive adhesive (hereinafter, abbreviated as "PSA") which is attached below the second transparent supporter layer (not illustrated).

The polarizing layer (not illustrated) is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The first and second transparent supporter layers (not illustrated) are films which support and protect the polarizing layer (not illustrated). Therefore, constituent materials of the first and second transparent supporter layers need to be optically transparent, do not cause double refraction, have heat resistance, and have a high mechanical strength to physically support and protect the polarizing layer (not illustrated).

Further, a surface thereof is vast and has a property which is capable of being bonded to a bonding agent or a pressure-sensitive adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornene resin.

In consideration of polarizing property and durability, desirably, a triacetyl cellulose (TAC) film in which a surface is saponified with alkali may be used.

The PSA (not illustrated) is applied to bond the polarizing plate having the above-described configuration to a liquid crystal cell and may be formed appropriately using an adhesive such as an acrylic adhesive, a silicon adhesive, a polyester adhesive, a polyurethane adhesive, a polyether adhesive, or a rubber adhesive. Specifically, in order to suppress peeling and exfoliation due to moisture absorption, lowering of chemical characteristics due to a difference in thermal expansion or curvature of a liquid crystal cell, and to form a high quality liquid crystal display device having excellent durability, it is desirable to use an adhesive having a low moisture absorption rate and excellent heat resistance.

Such an adhesive may be formed by forming a releasing cord by a releasing agent such as acrylic, silicon, acrylic silicon, polyester, heat-resistive rubber, long-chain acyl, fluorine, or molybdenum sulfide.

However, the upper polarizing plate 320 and the lower polarizing plate 330 are not limited to the above-described configuration, for example, a configuration which includes the polarizing layer, the first and second transparent supporter layers disposed above and below the polarizing layer, and the PSA disposed below the second transparent supporter layer. Therefore, the polarizing layer may be configured by a combination of various components. In the present disclosure, the above-described configuration has been described as one example.

In the meantime, the light absorption filter 340 is located below the fluorescent filter 350 and absorbs light in a predetermined wavelength range which is incident from a lower portion of the liquid crystal panel 310. In this case, Tetra-AzaPorphirin may be used as a material of the light absorption filter 340, but the material of the light absorption filter is not limited thereto.

Further, the light absorption filter 340 may absorb light in a predetermined wavelength range, for example, wavelength ranges of 380±50 nm (deep blue), 490±50 nm (cyan), 590±50 nm (yellow), 700±50 nm (deep red). In this case, the light absorption filter 340 is located below the fluorescent filter 350 to absorb light in the same wavelength range as a sensitive wavelength range of the fluorescent filter 350 to suppress distortion of light outgoing from the display.

However, as the light absorption wavelength (or the sensitive wavelength of the fluorescent filter), yellow or cyan is appropriate rather than red, green, and blue which may directly affect the image (display). The laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 350 is located below the upper polarizing plate 320 to absorb and excite light of a short wavelength having a high energy so that the light falls to a ground state to radiate long wavelength light.

Therefore, fluorescence is applied to a region of 400 nm or shorter having a high energy or a long wavelength region having a low energy among incident light which enters the fluorescent filter 350 through the laser pointer (not illustrated) to change an optical spectrum of the incident light and control the color.

The fluorescent filter 350 absorbs light in a first wavelength range and emits the light in the first wavelength range to be light in a second wavelength range which is longer than the first wavelength range. In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 350, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, and X-Rhodamine absorb yellow light to be emitted to red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

As described above, in order to solve a problem in that when the laser pointer illuminates a screen after driving the display, visibility is lowered at an angle other than a specific angle at which specular reflection occurs, the liquid crystal display device 300 according to the third exemplary embodiment of the present disclosure forms the fluorescent filter 350 below the upper polarizing plate 320 to improve visibility of the laser pointer. Differently from the first and second exemplary embodiments, in the third exemplary embodiment, since the upper polarizing plate 320 is located at an uppermost portion of the liquid crystal display device, luminous efficiency of the fluorescent filter 350, that is, laser visibility may be smaller than that of the first and second exemplary embodiment.

Further, according to the present disclosure, the light absorption filter 340 which absorbs light in the same wavelength range as the sensitive wavelength range is further disposed below the fluorescent filter 350 to suppress distortion of light outgoing from the display.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or Yellow is converted into red) to improve visibility.

Therefore, according to the present disclosure, the fluorescent filter 350 and the light absorption filter 340 are disposed below the upper polarizing plate 320, so that visibility of an omni-directional laser pointer in a display driving screen may be improved.

Figure 5:
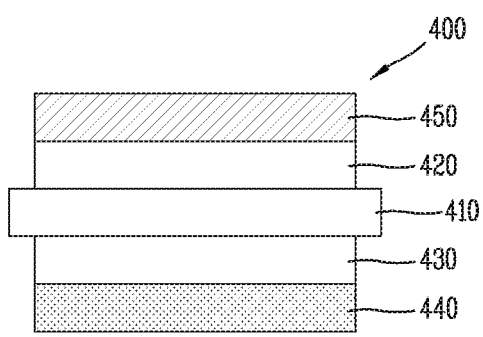
FIG. 5 is a cross-sectional view schematically illustrating a liquid crystal display device according to a fourth exemplary embodiment of the present disclosure.

FIG. 5 is a cross-sectional view schematically illustrating a liquid crystal display device according to a fourth exemplary embodiment of the present disclosure.

As illustrated in FIG. 5, a liquid crystal display device 400 according to a fourth exemplary embodiment of the present disclosure includes a liquid crystal panel 410 on which an image is displayed, an upper polarizing plate 420 disposed above the liquid crystal panel 410, a lower polarizing plate 430 disposed below the liquid crystal panel 410, a light absorption filter 440 disposed below the lower polarizing plate 430, and a fluorescent filter 450 which is disposed above the upper polarizing plate 420.

Here, even though not illustrated in the drawing, the upper polarizing plate 420 and the lower polarizing plate 430 may include a polarizing layer (not illustrated) which polarizes incident light, first and second transparent supporter layers (not illustrated) disposed above and below the polarizing layer (not illustrated), and a pressure sensitive adhesive (hereinafter, abbreviated as "PSA") which is attached below the second transparent supporter layer (not illustrated).

The polarizing layer (not illustrated) is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The first and second transparent supporter layers (not illustrated) are films which support and protect the polarizing layer (not illustrated). Therefore, constituent materials of the first and second transparent supporter layers need to be optically transparent, do not cause double refraction, have heat resistance, and have a high mechanical strength to physically support and protect the polarizing layer (not illustrated).

Further, a surface thereof is vast and has a property which is capable of being bonded to a bonding agent or a pressure-sensitive adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornene resin.

In consideration of polarizing property and durability, desirably, a triacetyl cellulose (TAC) film in which a surface is saponified with alkali may be used.

The PSA (not illustrated) is applied to bond the polarizing plate having the above-described configuration to a liquid crystal cell and may be formed appropriately using an adhesive such as an acrylic adhesive, a silicon adhesive, a polyester adhesive, a polyurethane adhesive, a polyether adhesive, or a rubber adhesive. Specifically, in order to suppress peeling and exfoliation due to moisture absorption, lowering of chemical characteristics due to a difference in thermal expansion or curvature of a liquid crystal cell, and to form a high quality liquid crystal display device having excellent durability, it is desirable to use an adhesive having a low moisture absorption rate and excellent heat resistance.

Such an adhesive may be formed by forming a releasing cord by a releasing agent such as acrylic, silicon, acrylic silicon, polyester, heat-resistive rubber, long-chain acyl, fluorine, or molybdenum sulfide.

However, the upper polarizing plate 420 and the lower polarizing plate 430 are not limited to the above-described configuration, for example, a configuration which includes the polarizing layer, the first and second transparent supporter layers disposed above and below the polarizing layer, and the PSA disposed below the second transparent supporter layer. Therefore, the polarizing layer may be configured by a combination of various components. In the present disclosure, the above-described configuration has been described as one example.

In the meantime, the light absorption filter 440 is disposed below the lower polarizing plate 430 disposed below the liquid crystal panel 410 and absorbs light in a predetermined wavelength entering from a light source unit which is equipped below the liquid crystal panel 410, that is, a backlight unit (not illustrated). In this case, Tetra-AzaPorphirin may be used as a light absorption material of the light absorption filter 440, but the material of the light absorption filter is not limited thereto.

Further, as the light absorption filter 440, a material which is capable of absorbing light in a predetermined wavelength range, for example, wavelength ranges of 380±50 nm (deep blue), 490±50 nm (cyan), 590±50 nm (yellow), or 700±50 nm (deep red) is applicable.

In this case, the light absorption filter 440 is located below the lower polarizing plate 430 to absorb light in the same wavelength range as a sensitive wavelength range of the fluorescent filter 450 to improve color reproduction rate of light outgoing from the display.

As the light absorption wavelength (or a sensitive wavelength of the fluorescent filter), yellow or cyan is appropriate rather than red, green, and blue which may directly affect the image (display). However, the laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 450 is located at the outside of the upper polarizing plate 420 to absorb and excite light of a short wavelength having a high energy so that the light falls to a ground state to radiate long wavelength light.

Therefore, fluorescence is applied to a region of 400 nm or shorter having a high energy or a long wavelength region having a low energy among incident light which enters the upper polarizing plate 420 through the laser pointer (not illustrated) to change an optical spectrum of the incident light and control the color.

The fluorescent filter 450 absorbs light in a first wavelength range and emits the light in the first wavelength range to be light in a second wavelength range which is longer than the first wavelength range. In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 450, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, and X-Rhodamine absorb yellow light to be emitted to be red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

As described above, in order to solve a problem in that when the laser pointer illuminates a screen after driving the display, visibility is lowered at an angle other than a specific angle at which specular reflection occurs, the liquid crystal display device 400 according to the fourth exemplary embodiment of the present disclosure forms the fluorescent filter 450 at the outside of the liquid crystal display device 400, that is, on an external surface of the upper polarizing plate 420 to improve visibility of the laser pointer.

Further, according to the present disclosure, the light absorption filter 440 is further disposed at the outside of the lower polarizing plate 430 below the liquid crystal panel 410 to improve color reproduction rate of light outgoing from the display.

Further, according to the present disclosure, as a light absorption wavelength or a fluorescent substance sensitive wavelength, yellow or cyan is appropriate rather than R/G/B which may directly affect the image (display). Therefore, the laser pointer radiates the same wavelength to be excited to a wavelength having good visibility (for example, cyan is converted into green or Yellow is converted into red) to improve visibility.

Therefore, according to the present disclosure, the fluorescent filter 450 is disposed above the upper polarizing plate 420 and the light absorption filter 440 is disposed below the lower polarizing plate 430, so that visibility of an omni-directional laser pointer in a display driving screen may be improved.

Figure 6:
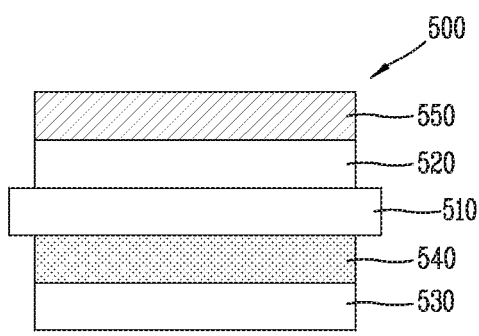
FIG. 6 is a cross-sectional view schematically illustrating a liquid crystal display device according to a fifth exemplary embodiment of the present disclosure.

FIG. 6 is a cross-sectional view schematically illustrating a liquid crystal display device according to a fifth exemplary embodiment of the present disclosure.

As illustrated in FIG. 6, a liquid crystal display device 500 according to a fifth exemplary embodiment of the present disclosure includes a liquid crystal panel 510 on which an image is displayed, an upper polarizing plate 520 disposed above the liquid crystal panel 510, a lower polarizing plate 530 disposed below the liquid crystal panel 510, a light absorption filter 540 disposed between the lower polarizing plate 530 and the liquid crystal panel 510, and a fluorescent filter 550 which is disposed above the upper polarizing plate 520.

Here, even though not illustrated in the drawing, the upper polarizing plate 520 and the lower polarizing plate 530 may include a polarizing layer (not illustrated) which polarizes incident light, first and second transparent supporter layers (not illustrated) disposed above and below the polarizing layer (not illustrated), and a pressure sensitive adhesive (hereinafter, abbreviated as "PSA") which is attached below the second transparent supporter layer (not illustrated).

The polarizing layer (not illustrated) is formed by adsorbing a halogen salt crystal such as iodine onto a poly-vinyl alcohol (hereinafter, referred to as "PVA") film and then stretching the PVA film in a specific direction to align iodine crystals to be parallel in the stretching direction.

The iodine crystals absorb light which is incident in a first direction and transmits light which is incident in a second direction perpendicular to the first direction to achieve the polarizing function.

The first and second transparent supporter layers (not illustrated) are films which support and protect the polarizing layer (not illustrated). Therefore, constituent materials of the first and second transparent supporter layers need to be optically transparent, do not cause double refraction, have heat resistance, and have a high mechanical strength to physically support and protect the polarizing layer (not illustrated).

Further, a surface thereof is vast and has a property which is capable of being bonded to a bonding agent or a pressure-sensitive adhesive. For example, the constituent material includes acetate resin such as triacetyl cellulose (TAC), polyester resin, polyether sulfone resin, polycarbonate resin, polyamide resin, polyimide resin, polyolefin resin, acrylic resin, and polynorbornene resin.

In consideration of polarizing property and durability, desirably, a triacetyl cellulose (TAC) film in which a surface is saponified with alkali may be used.

The PSA (not illustrated) is applied to bond the polarizing plate having the above-described configuration to a liquid crystal cell and may be formed appropriately using an adhesive such as an acrylic adhesive, a silicon adhesive, a polyester adhesive, a polyurethane adhesive, a polyether adhesive, or a rubber adhesive. Specifically, in order to suppress peeling and exfoliation due to moisture absorption, lowering of chemical characteristics due to a difference in thermal expansion or curvature of a liquid crystal cell, and to form a high quality liquid crystal display device having excellent durability, it is desirable to use an adhesive having a low moisture absorption rate and excellent heat resistance.

Such an adhesive may be formed by forming a releasing cord by a releasing agent such as acrylic, silicon, acrylic silicon, polyester, heat-resistive rubber, long-chain acyl, fluorine, or molybdenum sulfide.

However, the upper polarizing plate 520 and the lower polarizing plate 530 are not limited to the above-described configuration, for example, a configuration which includes the polarizing layer, the first and second transparent supporter layers disposed above and below the polarizing layer, and the PSA disposed below the second transparent supporter layer. Therefore, the polarizing layer may be configured by a combination of various components. In the present disclosure, the above-described configuration has been described as one example.

In the meantime, the light absorption filter 540 is disposed between the liquid crystal panel 510 and the lower polarizing plate 530 and absorbs light in a predetermined wavelength entering from a light source unit which is equipped below the liquid crystal panel 510, that is, a backlight unit (not illustrated). In this case, Tetra-AzaPorphirin may be used as a material of the light absorption filter 540, but the material of the light absorption filter is not limited thereto. Further, as a material of the light absorption filter 540, a material which is capable of absorbing light in wavelength ranges of 380±50 nm (deep blue), 490±50 nm (cyan), 590±50 nm (yellow), and 700±50 nm (deep red) may be used.

In this case, the light absorption filter 540 is located between the liquid crystal panel 510 and the lower polarizing plate 530 to absorb light in the same wavelength range as a sensitive wavelength range of the fluorescent filter 550 to improve color reproduction rate of the display.

However, as the light absorption wavelength (or the sensitive wavelength of the fluorescent filter), yellow or cyan is appropriate rather than red, green, and blue which may directly affect the image (display). The laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 550 is located above the upper polarizing plate 520 to absorb and excite light of a short wavelength having a high energy so that the light falls to a ground state to radiate long wavelength light.

Therefore, fluorescence is applied to a region of 400 nm or shorter having a high energy or a long wavelength region having a low energy among incident light which enters the fluorescent filter 550 through the laser pointer (not illustrated) to change an optical spectrum of the incident light and control the color.

The fluorescent filter 550 absorbs light in a first wavelength range and emits the light in the first wavelength range to be light in a second wavelength range which is longer than the first wavelength range. In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 550, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, and X-Rhodamine absorb yellow light to be emitted to be red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

As described above, in order to solve a problem in that when the laser pointer illuminates a screen after driving the display, visibility is lowered at an angle other than a specific angle at which specular reflection occurs, the liquid crystal display device 500 according to the fifth exemplary embodiment of the present disclosure forms the fluorescent filter 550 above the upper polarizing plate 520 to improve visibility of the laser pointer.

Further, according to the present disclosure, the light absorption filter 540 which absorbs light in the same wavelength range as the sensitive wavelength range is further disposed between the liquid crystal panel 510 and the lower polarizing plate 530, below the fluorescent filter 550 to improve color reproduction rate of the display.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or Yellow is converted into red) to improve visibility.

Therefore, according to the present disclosure, the fluorescent filter 550 is disposed above the upper polarizing plate 520 and the light absorption filter 540 is disposed between the liquid crystal panel 510 and the lower polarizing plate 530, so that visibility of an omni-directional laser pointer in a display driving screen may be improved.

Figure 7:
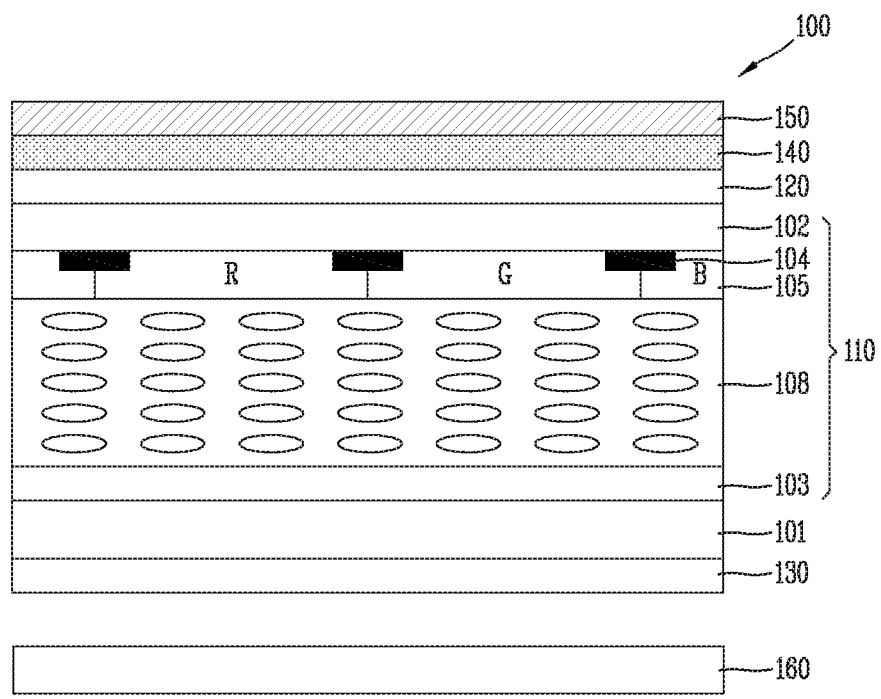
FIG. 7 is a cross-sectional view specifically illustrating a liquid crystal display device according to a first exemplary embodiment of the present disclosure.

FIG. 7 is a cross-sectional view specifically illustrating a liquid crystal display device according to a first exemplary embodiment of the present disclosure.

Figure 8:
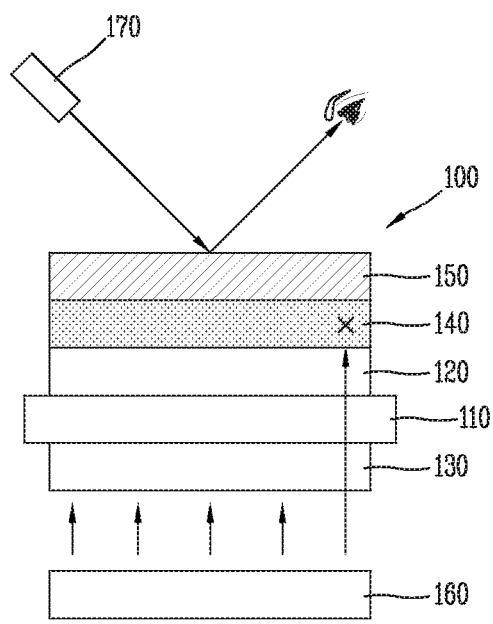
FIG. 8 is a schematic cross-sectional view of a liquid crystal display device according to a first exemplary embodiment of the present disclosure when light is irradiated by an infrared pointer.

FIG. 8 is a schematic cross-sectional view of a liquid crystal display device according to a first exemplary embodiment of the present disclosure when light is irradiated by an infrared pointer.

As illustrated in FIG. 7, the liquid crystal display device 100 according to the first exemplary embodiment of the present disclosure includes a liquid crystal panel 110 on which an image is displayed, an upper polarizing plate 120 disposed above the liquid crystal panel 110, a lower polarizing plate 130 disposed below the liquid crystal panel 110, a light absorption filter 140 and a fluorescent filter 150 which are laminated above the upper polarizing plate 120, and a backlight unit 160 which supplies light to the liquid crystal panel 110 below the lower polarizing plate 130.

Here, the liquid crystal panel 110 may include a thin film transistor array substrate 102, a color filter array substrate 104 which is disposed to be opposite to the thin film transistor array substrate 102, and a liquid crystal layer 108 formed between the two substrates 102 and 104.

The thin film transistor array substrate 102 includes a first substrate (not illustrated) and a thin film transistor array 103 including a plurality of thin film transistors (not illustrated) formed on the first substrate in a matrix.

The color filter array substrate 102 includes a second substrate (not illustrated), red, green, and blue color filters 105 formed on the second substrate (not illustrated), and a black matrix 104 which is formed between the color filters 105 to separate areas of the color filters 105 and suppress light leakage.

Referring to FIG. 8, the light absorption filter 140 is located below the fluorescent filter 150 and absorbs light in a predetermined wavelength range which is incident from the back light unit 160 to the liquid crystal panel 110. In this case, Tetra-AzaPorphirin may be used as a material of the light absorption filter 140, but the material of the light absorption filter is not limited thereto. That is, as a material of the light absorption filter 140, a material which is capable of absorbing light in a predetermined wavelength range, for example, wavelength ranges of 380±50 nm (deep blue), 490±50 nm (cyan), 590±50 nm (yellow), or 700±50 nm (deep red) may be used.

Therefore, the light absorption filter 140 is located below the fluorescent filter 150 to absorb light in the same wavelength range as a sensitive wavelength range of the fluorescent filter 150 to suppress distortion of light outgoing from the display.

However, as the light absorption wavelength (or the sensitive wavelength of the fluorescent filter), yellow or cyan is appropriate rather than red, green, and blue which may directly affect the image (display). The laser pointer also radiates the same wavelength to be excited to a visible wavelength (that is, light in a cyan wavelength range is converted into light in a green wavelength range or light in a yellow wavelength range is converted into light in a red wavelength range) so that visibility may be improved.

In the meantime, the fluorescent filter 150 is located at the outside of the upper polarizing plate 120 to absorb and excite light of a short wavelength having a high energy so that the light falls to a ground state to radiate long wavelength light.

Referring to FIG. 8, fluorescence is applied to a region of 400 nm or shorter having a high energy or a long wavelength region having a low energy among incident light which enters the upper polarizing plate 120 through the laser pointer 170 to change an optical spectrum of the incident light and control the color.

The fluorescent filter 150 absorbs light in a first wavelength range and emits the light in the first wavelength range to be light in a second wavelength range which is longer than the first wavelength range. In this case, the light in the first wavelength range is light of 380±50 nm (deep blue), 490±50 nm (cyan), 590±50 nm (yellow), and 700±50 nm (deep red) and the light in the second wavelength range includes light of 650±50 nm (red), 550±50 nm (green), and 450±50 nm (blue). Broadly, the light may include the entire visible ray region (380 to 780 nm).

As a material of the fluorescent filter 150, any one of Bodipy TR, PYronine B, Texas Red, X-Rhodamine, Acridine Yellow, Acridine Red, Acriflavin, and Astrazon Orange R may be selected.

The Bodipy TR, PYronine B, Texas Red, and X-Rhodamine absorb yellow light to be emitted to be red light.

Specifically, Bodipy TR absorbs light in 550 to 590 nm to emit light in 600 to 630 nm and PYronine B absorbs light in 540 to 560 nm to emit light in 560 to 650 nm. Texas Red absorbs light in 560 to 600 nm to emit light in 580 to 630 nm and X-Rhodamine absorbs light in the wavelength range of 570 to 610 nm to emit light in the wavelength range of 580 to 630 nm.

The Acridine Yellow, Acridine Red, Acriflavin, and Astrazon Orange R absorb cyan light to emit green light.

Specifically, Acridine Yellow absorbs light in 450 to 500 nm to emit light in 530 to 570 nm and Acridine Red absorbs light in 455 to 600 nm to emit light in 560 to 680 nm. Acriflavin absorbs light in 420 to 450 nm to emit light in 470 to 550 nm and Astrazon Orange R absorbs light in the wavelength range of 450 to 520 nm to emit light in the wavelength range of 520 to 560 nm.

Figure 9:
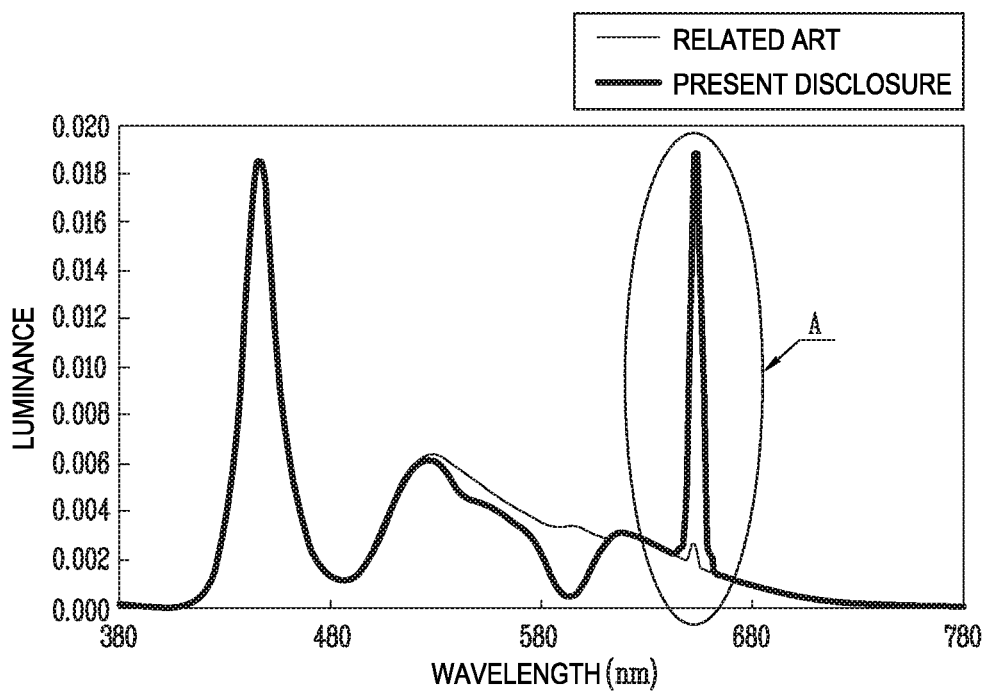
FIG. 9 is a graph of luminance according to a wavelength illustrating laser visibility in a white image of a liquid crystal display device according to the present disclosure.

FIG. 9 is a graph of luminance according to a wavelength illustrating laser visibility in a white image of a liquid crystal display device according to the present disclosure.

Figure 10:
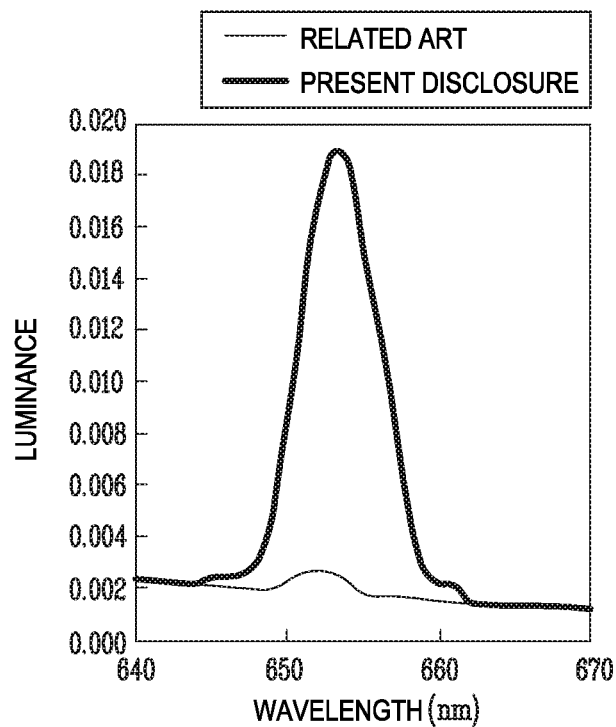
FIG. 10 is a graph illustrating luminance in a light emitting unit in a liquid crystal display device according to the present disclosure by enlarging "A" of FIG. 9.

FIG. 10 is a graph illustrating luminance in a light emitting unit in a liquid crystal display device according to the present disclosure by enlarging "A" of FIG. 9.

Here, as an example, laser light in a wavelength range of 590 nm is irradiated.

When light in a wavelength range of 590 nm is irradiated onto the liquid crystal display device 100 using a laser pointer 170 illustrated in FIG. 8, the fluorescent filter 150 absorbs light in the wavelength of 590 nm to excite the light so that the light falls to a ground state to emit long wavelength light of approximately 650 nm.

As illustrated in FIGS. 9 and 10, it is understood that in the related art, a luminance peak is low in the wavelength range near 650 nm, but in the present disclosure, the luminance peak is high in the wavelength range near 650 nm.

Figure 11:
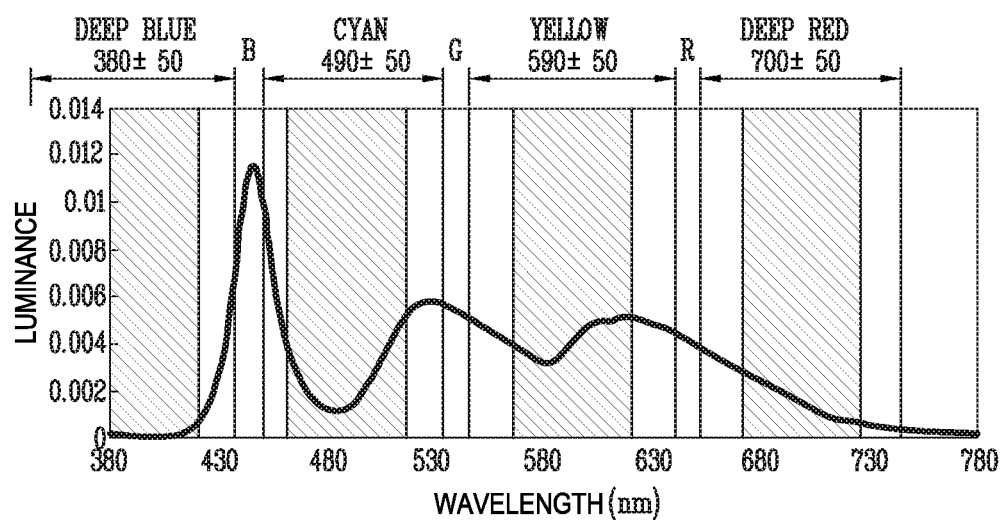
FIG. 11 is a graph illustrating a white spectrum of a liquid crystal display device according to the present disclosure.

FIG. 11 is a graph illustrating a white spectrum of a liquid crystal display device according to the present disclosure.

As illustrated in FIG. 11, a white spectrum of the liquid crystal display device is illustrated. The fluorescent filter 150 absorbs light in the light absorption area, that is, light in the wavelength ranges of 390±50 nm (deep blue), 490±50 nm (cyan), 590±50 nm (yellow), 700±50 nm (deep red). In this case, for example, light in the wavelength range of 490±50 nm (cyan) is converted into light in the wavelength range of 550±50 nm (green) to be emitted and light in the wavelength range of 590±50 nm (yellow) is converted into light in the wavelength range of 630±50 nm (red) to be emitted.

That is, light in the wavelength range having low luminance, that is, deep blue, cyan, yellow, and deep red light are absorbed by the fluorescent filter 150 to be emitted as blue, green, and red light in the wavelength range having a high luminance.

As described above, in order to solve the problem in that when the laser pointer illuminates a screen after driving the display, visibility is lowered at an angle other than a specific angle at which specular reflection occurs, the liquid crystal display device according to the present disclosure forms the fluorescent filter on an external surface of the liquid crystal display device to improve visibility of the laser pointer.

Further, according to the present disclosure, the light absorption filter which absorbs light in the same wavelength range as the sensitive wavelength range is further disposed below the fluorescent filter to suppress distortion of light outgoing from the display.

Further, according to the present disclosure, as a light absorption wavelength or a fluorescent substance sensitive wavelength, yellow or cyan is appropriate rather than R/G/B which may directly affect the image. Therefore, the laser pointer radiates the same wavelength to be excited to a wavelength having good visibility (for example, cyan is converted into green or Yellow is converted into red) to improve visibility.

Therefore, according to the present disclosure, the light absorption filter and the fluorescent filter are disposed above the upper polarizing plate, so that visibility of an omnidirectional laser pointer in a display driving screen may be improved.

Further, the light absorption filter is disposed above the liquid crystal panel, so that reflectance is lowered and a contrast ratio is improved to improve visual sensitivity and implement high color reproduction.

The liquid crystal display device according to the exemplary embodiments of the present disclosure can also be described as follows:

According to an exemplary embodiment of the present disclosure, the liquid crystal display device includes a liquid crystal panel on which an image is displayed, a light source unit which supplies light to the liquid crystal panel, a lower polarizing plate disposed below the liquid crystal panel and an upper polarizing plate, a light absorption filter, and a fluorescent filter disposed above the liquid crystal panel.

The upper polarizing plate may be disposed above the liquid crystal panel and the light absorption filter and the fluorescent filter may be laminated above the upper polarizing plate.

The light absorption filter may be disposed above the liquid crystal panel and the upper polarizing plate and the fluorescent filter may be laminated above the light absorption filter.

The light absorption filter and the fluorescent filter may be laminated above the liquid crystal panel and the upper polarizing plate may be disposed above the fluorescent filter.

The fluorescent filter may absorb light in a first wavelength band and emit the light in the first wavelength band to be light in a second wavelength band which is longer than the first wavelength band.

The light in the first wavelength band may be light of 380±50 nm (deep blue), 490±50 nm (cyan), 590±50 nm (yellow), and 700±50 nm (deep red) and the light in the second wavelength band may include light of 650±50 nm (red), 550±50 nm (green), and 450±50 nm (blue) or light of 380 to 780 nm.

As a material of the fluorescent filter, any one of Bodipy TR, PYronine B, Texas Red, X-Rhodamine, Acridine Yellow, Acridine Red, Acriflavin, Astrazon Orange R may be selected.

The fluorescent materials of Bodipy TR, PYronine B, Texas Red, and X-Rhodamine may emit light in a yellow absorption wavelength range of 590±50 nm to be light in a red emission wavelength range of 600±50 nm.

The fluorescent materials of Acridine Yellow, Acridine Red, Acriflavin, and Astrazon Orange R may emit light in a cyan absorption wavelength range of 490±50 nm to be light in a red emission wavelength range of 550±50 nm.

As a material of the light absorption filter, Tetra-AzaPorphirin may be included.

According to another exemplary embodiment of the present disclosure, the liquid crystal display device includes a liquid crystal panel on which an image is displayed, a light source unit which supplies light to the liquid crystal panel, an upper polarizing plate disposed above the liquid crystal panel, a fluorescent filter disposed above the upper polarizing plate and a lower polarizing plate and a light absorption filter disposed below the liquid crystal panel.

The lower polarizing plate may be disposed below the liquid crystal panel and the light absorption filter may be disposed above the lower polarizing plate.

The light absorption filter may be disposed below the liquid crystal panel and the lower polarizing plate may be disposed above the light absorption filter.

The fluorescent filter may absorb light in a first wavelength band and emit the light in the first wavelength band to be light in a second wavelength band which is longer than the first wavelength band.

The light in the first wavelength band may be light of 380±50 nm (deep blue), 490±50 nm (cyan), 590±50 nm (yellow), and 700±50 nm (deep red) and the light in the second wavelength band may include light of 650±50 nm (red), 550±50 nm (green), and 450±50 nm (blue) or light of 380 to 780 nm of an entire visible ray region.

As a material of the fluorescent filter, any one of Bodipy TR, PYronine B, Texas Red, X-Rhodamine, Acridine Yellow, Acridine Red, Acriflavin, Astrazon Orange R may be selected.

The fluorescent materials of Bodipy TR, PYronine B, Texas Red, and X-Rhodamine may emit light in a yellow absorption wavelength range of 590±50 nm to be light in a red emission wavelength range of 600±50 nm.

The fluorescent materials of Acridine Yellow, Acridine Red, Acriflavin, and Astrazon Orange R may emit light in a cyan absorption wavelength range of 490±50 nm to be light in a red emission wavelength range of 550±50 nm.

As a material of the light absorption filter, Tetra-AzaPorphirin may be included.

It will be appreciated by those skilled in the art that the present disclosure as described above may be implemented into other specific forms without departing from the technical spirit thereof or essential characteristics.

Thus, it is to be appreciated that embodiments described above are intended to be illustrative in every sense, and not restrictive. The scope of the present disclosure is represented by the claims to be described below rather than the detailed description, and it is to be interpreted that the meaning and scope of the claims and all the changes or modified forms derived from the equivalents thereof come within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
   a liquid crystal panel on which an image is displayed, the liquid crystal panel including a liquid crystal layer and a plurality of color filters on the liquid crystal layer;
   a light source unit which supplies light to the liquid crystal panel;
   a lower polarizing plate disposed below the liquid crystal panel;
   an upper polarizing plate;
   a light absorption filter overlying the plurality of color filters for absorbing light of a predetermined wavelength range; and
   a fluorescent filter,
   wherein the upper polarizing plate, the light absorption filter, and the fluorescent filter are disposed above the liquid crystal panel.

2. The liquid crystal display device according to claim 1, wherein the light absorption filter and the fluorescent filter are laminated above the upper polarizing plate.

3. The liquid crystal display device according to claim 1, wherein the upper polarizing plate and the fluorescent filter are laminated above the light absorption filter.

4. The liquid crystal display device according to claim 1, wherein the light absorption filter and the fluorescent filter are laminated above the liquid crystal panel and the upper polarizing plate is disposed above the fluorescent filter.

5. The liquid crystal display device according to claim 1, wherein the fluorescent filter absorbs light in a first wavelength band and emits light in a second wavelength band which is longer than the first wavelength band.

6. The liquid crystal display device according to claim 5, wherein the light in the first wavelength band includes light of 380±50 nm (deep blue), 490±50 nm (cyan), 590±50 nm (yellow), and 700±50 nm (deep red) and the light in the second wavelength band includes light of 650±50 nm (red), 550±50 nm (green), and 450±50 nm (blue) or light of 380 to 780 nm.

7. The liquid crystal display device according to claim 1, wherein the fluorescent filter includes at least one of: Bodipy TR, PYronine B, Texas Red, X-Rhodamine, Acridine Yellow, Acridine Red, Acriflavin, and Astrazon Orange R.

8. The liquid crystal display device according to claim 7, wherein the fluorescent materials of Bodipy TR, PYronine B, Texas Red, and X-Rhodamine absorb light in a yellow absorption wavelength range of 590±50 nm and emit light in a red emission wavelength range of 600±50 nm.

9. The liquid crystal display device according to claim 7, wherein the fluorescent materials of Acridine Yellow, Acridine Red, Acriflavin, and Astrazon Orange R absorb light in a cyan absorption wavelength range of 490±50 nm and emit light in a red emission wavelength range of 550±50 nm.

10. The liquid crystal display device according to claim 1, wherein the light absorption filter includes Tetra-AzaPorphirin.

11. A liquid crystal display device, comprising:
    a liquid crystal panel on which an image is displayed;
    a light source unit which supplies light to the liquid crystal panel;
    a lower polarizing plate disposed below the liquid crystal panel;
    an upper polarizing plate;
    a light absorption filter; and
    a fluorescent filter,
    wherein the upper polarizing plate, the light absorption filter, and the fluorescent filter are disposed above the liquid crystal panel, and the upper polarizing plate and the fluorescent filter are laminated above the light absorption filter.

12. The liquid crystal display device according to claim 11, wherein the fluorescent filter absorbs light in a first wavelength band and emits light in a second wavelength band which is longer than the first wavelength band.

13. The liquid crystal display device according to claim 12, wherein the light in the first wavelength band includes light of 380±50 nm (deep blue), 490±50 nm (cyan), 590±50 nm (yellow), and 700±50 nm (deep red) and the light in the second wavelength band includes light of 650±50 nm (red), 550±50 nm (green), and 450±50 nm (blue) or light of 380 to 780 nm.

14. The liquid crystal display device according to claim 11, wherein the fluorescent filter includes at least one of: Bodipy TR, PYronine B, Texas Red, X-Rhodamine, Acridine Yellow, Acridine Red, Acriflavin, and Astrazon Orange R.

15. The liquid crystal display device according to claim 14, wherein the fluorescent materials of Bodipy TR, PYronine B, Texas Red, and X-Rhodamine absorb light in a yellow absorption wavelength range of 590±50 nm and emit light in a red emission wavelength range of 600±50 nm.

16. The liquid crystal display device according to claim 14, wherein the fluorescent materials of Acridine Yellow, Acridine Red, Acriflavin, and Astrazon Orange R absorb light in a cyan absorption wavelength range of 490±50 nm and emit light in a red emission wavelength range of 550±50 nm.

17. The liquid crystal display device according to claim 11, wherein the light absorption filter includes Tetra-AzaPorphirin.

18. A liquid crystal display device, comprising:
a liquid crystal panel on which an image is displayed;
a light source unit which supplies light to the liquid crystal panel;
a lower polarizing plate disposed below the liquid crystal panel;
an upper polarizing plate;
a light absorption filter; and
a fluorescent filter,
wherein the upper polarizing plate, the light absorption filter, and the fluorescent filter are disposed above the liquid crystal panel, the light absorption filter and the fluorescent filter are laminated above the liquid crystal panel, and the upper polarizing plate is disposed above the fluorescent filter.

19. The liquid crystal display device according to claim 18, wherein the fluorescent filter absorbs light in a first wavelength band and emits light in a second wavelength band which is longer than the first wavelength band.

20. The liquid crystal display device according to claim 19, wherein the light in the first wavelength band includes light of 380±50 nm (deep blue), 490±50 nm (cyan), 590±50 nm (yellow), and 700±50 nm (deep red) and the light in the second wavelength band includes light of 650±50 nm (red), 550±50 nm (green), and 450±50 nm (blue) or light of 380 to 780 nm.

* * * * *